United States Patent
Li et al.

(10) Patent No.: US 8,367,589 B2
(45) Date of Patent: *Feb. 5, 2013

(54) POLYSACCHARIDE TREATMENT FLUID AND METHOD OF TREATING A SUBTERRANEAN FORMATION

(75) Inventors: Leiming Li, Sugar Land, TX (US); Syed Ali, Sugar Land, TX (US); Oscar Bustos, Castle Rock, CO (US); Lijun Lin, Sugar Land, TX (US); Curtis L. Boney, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 12/143,065

(22) Filed: Jun. 20, 2008

(65) Prior Publication Data

US 2008/0305971 A1 Dec. 11, 2008

Related U.S. Application Data

(63) Continuation-in-part of application No. 11/042,215, filed on Jan. 24, 2005, now Pat. No. 7,494,957.

(51) Int. Cl.
*C09K 8/52* (2006.01)
*C09K 8/60* (2006.01)
*C09K 8/68* (2006.01)

(52) U.S. Cl. .......... 507/211; 507/90; 507/202; 507/213; 507/240; 507/248; 507/271; 507/273; 166/311

(58) Field of Classification Search .......................... None
See application file for complete search history.

(56) References Cited

U.S. PATENT DOCUMENTS

| | | |
|---|---|---|
| 3,692,676 A | 9/1972 | Culter |
| 3,937,283 A | 2/1976 | Blauer |
| 4,199,484 A | 4/1980 | Murphey |
| 4,368,136 A | 1/1983 | Murphey |
| 4,856,588 A | 8/1989 | Borchardt |
| 4,940,090 A | 7/1990 | Hoskin |
| 4,991,652 A | 2/1991 | Hoskin |
| 5,175,278 A | 12/1992 | Peik |
| 5,551,516 A | 9/1996 | Norman et al. |
| 5,688,844 A | 11/1997 | Chatterji |
| 5,782,300 A | 7/1998 | James |
| 5,964,295 A | 10/1999 | Brown |
| 6,035,936 A | 3/2000 | Whalen |

(Continued)

FOREIGN PATENT DOCUMENTS

| | | |
|---|---|---|
| EP | 0209277 | 4/1990 |
| WO | 9722564 | 6/1997 |

(Continued)

OTHER PUBLICATIONS

SPE 80242—A Circulating Foam Loop for Evaluating Foam at Conditions of Use by Richard D. Hutchins, Matthew J. Miller.

(Continued)

*Primary Examiner* — John J Figueroa
(74) *Attorney, Agent, or Firm* — Jeremy D. Tillman; Daryl R. Wright; Robin Nava

(57) ABSTRACT

A treatment fluid for treating a subterranean formation penetrated by a wellbore is formed from an aqueous medium, a diutan heteropolysaccharide having a tetrasaccharide repeating unit in the polymer backbone and a peroxide breaker. A method of treating a subterranean formation penetrated by a wellbore may be carried out by introducing the treatment fluid into the formation through the wellbore. Breaking aids or catalysts may also be used with the treatment fluid.

8 Claims, 4 Drawing Sheets

U.S. PATENT DOCUMENTS

| | | | |
|---|---|---|---|
| 6,110,271 | A | 8/2000 | Skaggs |
| 6,221,152 | B1 | 4/2001 | Dial |
| 6,227,295 | B1 | 5/2001 | Mitchell |
| 6,258,757 | B1 | 7/2001 | Sweatman |
| 6,258,859 | B1 | 7/2001 | Dahayanake |
| 6,397,864 | B1 | 6/2002 | Johnson |
| 6,454,008 | B1 | 9/2002 | Chatterji |
| 6,482,866 | B1 | 11/2002 | Dahayanake |
| 6,599,863 | B1 | 7/2003 | Palmer |
| 6,607,607 | B2 * | 8/2003 | Walker et al. ............... 134/18 |
| 6,620,775 | B2 | 9/2003 | Winston |
| 6,702,023 | B1 | 3/2004 | Harris |
| 6,703,352 | B2 | 3/2004 | Dahayanake |
| 6,720,290 | B2 | 4/2004 | England |
| 6,763,888 | B1 | 7/2004 | Harris |
| 6,828,280 | B2 | 12/2004 | England |
| 6,903,062 | B2 | 6/2005 | Griese |
| 7,584,791 | B2 * | 9/2009 | Robb et al. ............... 166/279 |
| 2003/0100460 | A1 | 5/2003 | Winston |
| 2003/0139297 | A1 | 7/2003 | Quintero |
| 2004/0121932 | A1 | 6/2004 | Griese |
| 2005/0261138 | A1 | 11/2005 | Robb et al. |
| 2006/0009363 | A1 | 1/2006 | Crews |
| 2006/0247135 | A1 * | 11/2006 | Welton et al. ............... 507/213 |
| 2007/0204997 | A1 | 9/2007 | Harris |
| 2008/0017382 | A1 | 1/2008 | Harris |
| 2008/0026957 | A1 * | 1/2008 | Gurmen et al. ............... 507/211 |
| 2008/0194427 | A1 * | 8/2008 | Welton et al. ............... 507/90 |
| 2009/0298720 | A1 * | 12/2009 | Nguyen et al. ............... 507/204 |

FOREIGN PATENT DOCUMENTS

| | | |
|---|---|---|
| WO | 0005322 A1 | 2/2000 |
| WO | 2006077558 A1 | 7/2006 |

OTHER PUBLICATIONS

Pollock, T.J., Sphingan Group of Exopolysaccharides (EPS), in Biopolymers, vol. 5, E.J. Vandamme, S. DeBaets, and A. Steinbuucchel, Editors. 2002, Wiley-VCH Verlag GmbH. p. 239-258.

Kuo, M.S., A.J. Mort, and A. Dell, Identification and location of L-glycerate, an unusual acyl substituent in gellan gum. Carbohydrate Research, 1986. 156: p. 173-187.

Stankowski, J.D. and S.G. Zeller, Location of the O-acetyl group in welan by teh reductive-cleavage method. Carbohydrate Research, 1992. 224: p. 337-341.

Chowdhury, T.A., et al., Structural studies of an extracellular polysaccharide, S-657, elaborated by Xanthomonas ATCC 53159. Carbohydrate Research, 1987. 164: p. 117-122.

Jansson, P.E., et al., Structural studies of a polysaccharide (S-194) elaborated by Alcaligenes ATCC 31961. Carbohydrate Research, 1986. 156: p. 157-163.

Jansson, P.E., N.S. Kumar, and B. Lindberg, Structural studies of a polysaccharide (S-88) elaborated by Pseudomonas ATCC 31554. Carbohydrate Research, 1986. 156: p. 165-172.

Chowdhury, T.A., B. Lindberg, and U. Lindquist, Structural studies of an extracellular polysaccharide (S-198) elaborated by Alcaligenes ATCC 31853. Carbohydrate Research, 1987. 161: p. 127-132.

Diltz, S. and S.G. Zeller, Location of O-acetyl groups in S-657 using the reductive-cleavage method. Carbohydrate Research, 2001. 331: p. 265-270.

Navarrete et al., New Bio-Polymers for Drilling, Drill-in, Completions, Spacer Fluids and Coiled Tubing Applications, pp. 1-17, SPE 62790, Sep. 2000.

* cited by examiner

POLYSACCHARIDE TREATMENT FLUID AND METHOD OF TREATING A SUBTERRANEAN FORMATION

CROSS REFERENCE TO RELATED PATENT APPLICATION

This application is a Continuation-In-Part of and also claims the benefit of U.S. Provisional application Ser. No. 11/042,215, filed Jan. 24, 2005 now U.S. Pat. No. 7,494,957.

BACKGROUND

The statements in this section merely provide background information related to the present disclosure and may not constitute prior art.

This invention relates to fluids used in treating a subterranean formation. In particular, the invention is related to aqueous wellbore treatment fluids containing a heteropolysaccharide, methods of forming such fluids, and uses thereof, and methods of breaking such fluids.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like.

Fluid technologies incorporating a gaseous component or a supercritical fluid to form a foam or energized fluid are commonly used in the stimulation of oil and gas wells. For example, some viscoelastic fluids used as fracturing fluids contain a gas such as air, nitrogen or carbon dioxide to provide an energized fluid or foam. Such fluids are commonly formed by injecting an aqueous solution ("base fluid") concomitantly with a gas, most commonly nitrogen, carbon dioxide or their mixtures, into the formation. Among other benefits, the dispersion of the gas into the base fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the base fluid from the interstices of the formation and of the proppant pack into the wellbore, due to the expansion of such gas once the pressure is reduced at the wellhead at the end of the fracturing operation. Other common uses of foams or energized fluids include wellbore cleanout, gravel packing, acid diversion, fluid loss control, and the like.

The viscosity of the fluid in which the gas is dispersed affects the resulting viscosity and stability of the foam. In general, foams are more stable and viscous as the viscosity of the base fluid increases. For this reason, high molecular weight polymers are commonly added to increase the viscosity of the base fluid. Commonly used polymers for fracturing applications are polysaccharides such as cellulose, derivatized cellulose, guar gum, derivatized guar gum, xanthan gum, or synthetic polymers such as polyacrylamides and polyacrylamide copolymers.

Incorporating crosslinkers into the fluid further augments the viscosity of the base fluid. Crosslinking consists of the attachment of two polymeric chains through the chemical association of such chains to a common element or chemical group, whereas such element or group is referred to as the crosslinker. Typical crosslinkers are polyvalent metal ions, more often zirconium or titanium ions, or borate ions. Crosslinking may be sensitive to the prevailing pH. For example, crosslinking with borate ions can be performed only in alkaline media (pH>8). pH-regulating systems ("buffers") are often required to achieve effective crosslinking with metal ions.

Foamed and energized fracturing fluids invariably contain "foamers", most commonly surfactant or blends of surfactants that facilitate the dispersion of the gas into the base fluid in the form of small bubbles or droplets, and confer stability to the dispersion by retarding the coalescence or recombination of such bubbles or droplets. Foamed and energized fracturing fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

Hydraulic fracturing is a stimulation technique routinely performed on oil and gas wells to increase fluid production from subterranean reservoirs. Specially engineered fluids, including energized fluids thickened with viscoelastic surfactants or polymeric gelling agents, are often pumped at high pressures and rates into the reservoir to be treated, causing a fracture to open. Proppants, such as ceramic beads or grains of sand, are slurried with the treating fluid (also referred to as carrier fluid) to keep the fracture open once the treatment is completed. Hydraulic fracturing creates high-conductivity communication with a large area of a formation and bypasses any damage that may exist in the near-wellbore area. It is therefore important for the treatment fluid to have enough viscosity to suspend and carry the proppant into the fracture zone. In some cases, however, depending upon specific subterranean formation conditions or job designs, energized fluids may not have high enough viscosity to achieve optimum proppant transportation and suspension, thereby resulting in poor proppant placement. Increased levels of viscosifying agent or surfactants may be required to achieve adequate proppant placement, thus leading to increased resource and material requirements.

The ability to formulate stable energized fluids with rheological properties suitable for fracturing operations becomes increasingly difficult as the temperature of the subterranean formation increases. The matter is worsened when carbon dioxide is present in the gas phase, since carbon dioxide exhibits high solubility in aqueous solutions. The high solubility of carbon dioxide facilitates mass transfer between bubbles and accelerates foam-destabilizing mechanisms such as so-called Ostwald ripening, which ultimately lead to phase separation and to the loss of fluid viscosity. Furthermore, carbon dioxide reacts with water to form carbonic acid. The formation of carbonic acid imposes a low pH environment for the fluid (typically in the range 3.5-4), thus impeding the necessary control of pH for efficient crosslinking with borate ions and often with other metallic ions. Exposure to low pH and high temperatures promotes degradation of the polymeric chains, particularly if polysaccharides are used as viscosifying agents, thus contributing to the referred loss of foam stability and viscosity.

Fluids containing polymers, such as those described above, are typically broken after the treatment is carried out so that the polymer, now broken, can be readily removed. Breaking agents are therefore typically added to the fluid for such cleanup, which may be delayed breaking agents, or the breaking agent may be added as a separate stage. In the case of polysaccharides, difficulty in breaking the polymer with breakers such as persulfates has been encountered, particularly at lower temperatures.

Accordingly, a need exists for improved polymer fluids that are useful for various treatments, such as hydraulic fracturing, and that can be readily removed over a wide variety of temperatures.

BRIEF DESCRIPTION OF THE DRAWINGS

For a more complete understanding of the present invention, and the advantages thereof, reference is now made to the following descriptions taken in conjunction with the accompanying figures, in which.

SUMMARY

Figure 1:
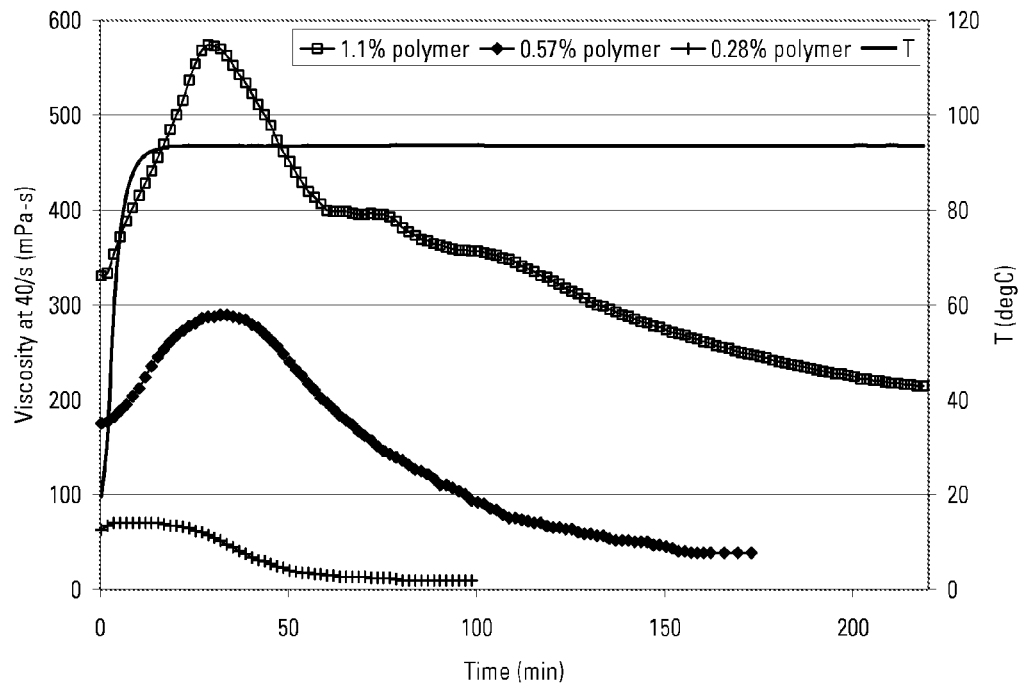
FIG. 1 is a plot of the fluid viscosity at 200° F. (93.3° C.) over time of aqueous solutions containing a 0.72% urea peroxide breaker and different amounts of diutan gum polymer.

A treatment fluid for treating a subterranean formation penetrated by a wellbore is formed from an aqueous medium and a diutan heteropolysaccharide having a tetrasaccharide repeating unit in the polymer backbone as represented by the formula:

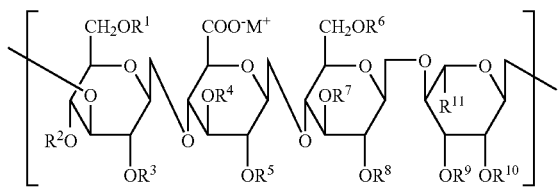

wherein at least three different saccharides are present in the repeating unit, such saccharides including D-glucose, D-glucuronic acid, and either L-rhamnose or L-mannose; $M^+$ is an ionic species; $R^1, R^2, R^3, R^4, R^5, R^6, R^7, R^8, R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$. The diutan heteropolysaccharide may be present in the fluid in an amount of from about 0.01% to about 4% by weight of the treatment fluid. In some embodiments, a crosslinker is incorporated, while in some others, a crosslinker is not incorporated, while in yet some other embodiments, a crosslinker is not incorporated to the extent that viscosity of the composition is effectively increased.

The treatment fluid further comprises a peroxide breaker. The peroxide breaker may be a stabilized peroxide breaker or a non-stabilized peroxide breaker. The peroxide breaker may selected from hydrogen peroxide, other peroxides such as sodium peroxide, calcium peroxide, and zinc peroxide, superoxides, urea peroxide, percarbonates, persulfates, perborates and hydrates thereof, organic peroxides, surfactant-stabilized peroxides, encapsulated peroxides or combinations of these. The peroxide breaker may include sodium percarbonate, potassium percarbonate, ammonium percarbonate, sodium persulfate, potassium persulfate, ammonium persulfate and sodium perborate. The peroxide breaker may be present in the fluid in an amount of from about 0.001% to 20% by weight of the fluid.

The treatment fluid may contain other components. The treatment fluid may contain a gas component and a proppant. Breaking aids or catalysts may also be used. The breaking aid or catalyst may be iron (II) sulfate and hydrates thereof, iron (II) chloride, iron (II) gluconate, iron powder with a pH-adjusting agent, a transition metal compound and combinations of these.

The treatment fluid may be used in a method of treating a subterranean formation penetrated by a wellbore by introducing the treatment fluid into the formation through the wellbore. The treatment fluid may be introduced into a portion of the formation having a temperature of 200° F. (93.3° C.) or less.

DETAILED DESCRIPTION

The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The invention provides well treatment fluids useful for treating a subterranean formation. In particular, the invention is aqueous wellbore treatment fluids containing a heteropolysaccharide, methods of forming such treatment fluids, and uses thereof. As used herein, the term "liquid phase" is meant to include all components of the fluid except the gas phase. The term "gas" is used herein to describe any fluid in a gaseous state or in a supercritical state, wherein the gaseous state refers to any state for which the temperature of the fluid is below its critical temperature and the pressure of the fluid is below its vapor pressure, and the supercritical state refers to any state for which the temperature of the fluid is above its critical temperature. As used herein, the terms "energized fluid" and "fluid" are used interchangeably to describe any stable mixture of gas phase and liquid phase, including foams, notwithstanding the foam quality value, i.e. the ratio of gas volume to the total volume of gas and liquid phases.

Energized fluids are often used in the stimulation of oil and gas wells, and are formed and applied by injecting an aqueous solution concomitantly with a gas (most commonly nitrogen, carbon dioxide or their mixtures). The dispersion of the gas into the base fluid in the form of bubbles increases the viscosity of such fluid and impacts positively its performance, particularly its ability to effectively induce hydraulic fracturing of the formation, and also its capacity to carry solids, such as proppants. The presence of the gas also enhances the flowback of the fluid. It is commonly known that stable energized fluids or foams with rheology properties suitable for oilfield operations becomes increasingly difficult when the formation temperature is above 121° C., or even up to 150° C. U.S. Patent Publication Nos. US2006/0166836; US2006/0166837 and US2006/0178276, each of which is incorporated by reference in its entirety, describe that by combining a heteropolysaccharide, such as a sphingan, concomitantly with a gas, an electrolyte, and a surfactant, an aqueous energized fluid is provided with exceptional rheology properties, particle suspension and particle transport capabilities, as well as gas phase stability, especially at elevated temperatures. As such, aqueous energized fluids may include an aqueous medium, a gas component, a heteropolysaccharide, an electrolyte, and a surfactant. The aqueous medium is usually water or brine. The fluids may also include an organoamino compound. When used as fracturing fluids, embodiments of the invention may further include a proppant.

Fluid compositions of the invention are useful in oilfield operations, including such operations as fracturing subterranean formations, modifying the permeability of subterranean formations, fracture or wellbore cleanup, acid fracturing, matrix acidizing, gravel packing or sand control, and the like. Another application includes the placement of a chemical plug to isolate zones or to assist an isolating operation.

The gas component of the fluids, if used, may be produced from any suitable gas that forms an energized fluid when introduced into the aqueous medium. See, for example, U.S. Pat. No. 3,937,283 (Blauer et al.) hereinafter incorporated by reference. The gas component may comprise a gas selected from the group consisting of nitrogen, air, carbon dioxide and any mixtures thereof. In certain applications the gas component may comprise carbon dioxide, in any quality readily available. The gas component assists in the fracturing operation and the well clean-up process. The fluid may contain from about 10% to about 90% volume gas component based upon total fluid volume percent, in certain applications from about 30% to about 80% volume gas component based upon total fluid volume percent, and in certain applications from about 40% to about 70% volume gas component based upon total fluid volume percent.

Fluids of the invention include a heteropolysaccharide. While any suitable heteropolysaccharide may be used, microbial polysaccharides commonly known as sphingans are particularly useful. Sphingans generally are acidic capsular heteropolysaccharides secreted by Sphingomonas bacteria as described by Pollock, T. J., Sphingan Group of Exopolysaccharides (EPS), in Biopolymers, Vol. 5, E. J. Vandamme, S. DeBaets, and A. Steinbuchel, Editors. 2002, Wiley-VCH Verlag GmbH, p. 239-258. In some embodiments of the invention, the heteropolysaccharide is an sphingan or a derivatized sphingan having a tetrasaccharide repeating unit in the polymer backbone as represented by the chemical formula:

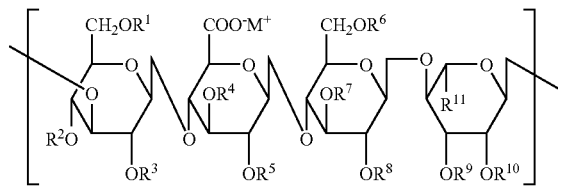

(1)

or represented by the alternative formula scheme:

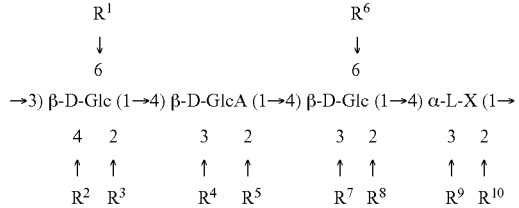

(2)

wherein at least three different saccharides are present in the repeating unit, such saccharides including D-glucose (D-Glc), D-glucuronic acid (D-GlcA), and either L-rhamnose (X=Rha; $R^{11}$=CH$_3$) or L-mannose (X=Man; $R^{11}$=CH$_2$OH); the weight average molecular weight (Mw) for the heteropolysaccharide is from about $10^5$ to about $10^7$; M$^+$ is any ionic species effective to associate via electrostatic interactions with the carboxylic group present in the D-glucuronic acid unit, wherein M$^+$ includes, for example, but not necessarily limited to: H$^+$, Na$^+$, K$^+$, NH$_4^+$, ½Ca$^{+2}$ and ½Mg$^+$2; substituents for the number 2 positions of all saccharide units ($R^3$, $R^5$, $R^8$, and $R^{10}$), substituents for the number 3 positions of the position number 4-linked saccharide units ($R^4$, $R^7$, and $R^9$), substituent for the number 4 position of the position 3-linked glucose unit ($R^2$), and substituents for the number 6 positions of the D-glucose units ($R^1$ and $R^6$) may be by non-limiting example a hydrogen (—H), methyl (—CH$_3$), acetyl (—COCH$_3$), glyceryl (—COCH$_2$(OH)CH$_2$OH) or a saccharide group containing one to three saccharide units, wherein the saccharide units present in the saccharide sidegroup include, but are not limited to: D-glucose, D-glucuronic acid, D-galacturonic acid, L-rhamnose, L-mannose, D-mannose, 2,3:5,6-gi-O-isopropylidene-D-mannofuranose, 2,3-O-isopropylidene-D-ribono-1,4-lactone, 3,4-O-isopropylidene-D-mannitol, D-arabinose, L-arabinose, D-erythrose, L-erythrose, D-fucose, L-fucose, lactulose, D-lyxose, maltulose, L-mannitol, D-mannono-1,4-lactone, L-mannono-1,4-lactone, methyl-α-D-fucopyranoside, D-ribonic acid, D-ribono-1,4-lactone, L-ribose, D-sorbose, D-tagatose, D-talitol, D-talose, L-xylose, and the like, and any derivatives. Also, the substituents $R^1$ thru $R^{11}$ above may differ from repeating unit to repeating unit within the heteropolysaccharide's backbone chemical structure. For example, $R^1$ could be hydrogen (—H) in one repeating unit and an acetyl group (—COCH$_3$) in the following repeating unit.

Suitable sphingans or derivatized sphingans include, but are not necessarily limited to, the following heteropolysaccharides and derivatives thereof:

(1) Gellan gum as described in Kuo, M. S., A. J. Mort, and A. Dell, Identification and location of L-glycerate, an unusual acyl substituent in gellan gum, Carbohydrate Research, 1986, 156: p. 173-187, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methyl (—CH$_3$) group (or X=Rha);

(2) Welan gum as described by Stankowski, J. D. and S. G. Zeller, Location of the O-acetyl group in welan by the reductive-cleavage method, Carbohydrate Research, 1992, 224: p. 337-341, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is an α-L-rhamnose or α-L-mannose group (α-L-Rha (1→, or α-L-Man(1→));

(3) Diutan gum as described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is two α-L-rhamnose groups linked at the 1,4 ring positions (α-L-Rha (1→4) α-L-Rha (1→);

(4) Heteropolysaccharide S-8 available from CP Kelco of 123 North Wacker Dr, Suite 2000 Chicago, Ill. 60606 USA, described by the manufacturer as an even purer diutan gum with respect to the S-657 strand. Purity is defined by the manufacturer for this product as % Diutan=% CO$_2$*(Mass of diutan repeating unit)/(mass of CO$_2$). The repeat unit mass was 992.93, assuming no acetate and the K$^+$ form. Hence, for S-8 strain, 4.0% CO$_2$ content was reported and purity=4*992.93/44=90.3%, as compared with S-657, 3.2% CO$_2$ giving purity=3.2*992.93/44=72.2%;

(5) Rhamsan gum as described by Jansson, P. E., et al., Structural studies of a polysaccharide (S-194) elaborated by Alcaligenes ATCC 31961, Carbohydrate Research, 1986, 156: p. 157-163, wherein $R^2$, $R^3$, $R^4$, $R^5$, $R^6$, $R^7$, $R^8$, $R^9$, and $R^{10}$ are hydrogen (—H) groups, $R^{11}$ is a methyl(—CH$_3$) group (or X=Rha), and $R^1$ is two β-D-glucose groups linked at the 1,6 ring positions (β-D-Glc(1→)-D-Glc(1→);

(6) Heteropolysaccharide S-88 as described by Jannson, P. E., N. S. Kumar, and B. Lindberg, Structural studies of a polysaccharide (S-88) elaborated by Pseudomonas ATCC 31554, Carbohydrate Research, 1986, 156: p. 165-172, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^7$ is an α-L-rhamnose group (α-L-Rha(1→);

(7) Heteropolysaccharide S-198 as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, wherein $R^1$, $R^3$, $R^4$, $R^5$, $R^6$, $R^7$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^2$ is an α-L-rhamnose group (α-L-Rha (1→); and (8) Heteropolysaccharide NW11 as described in Pollock, T. J., Sphingan Group of Exopolysaccharides (EPS), in Biopolymers, Vol. 5, E. J. Vandamme, S. DeBaets, and A. Steinbuchel, Editors, 2002, Wiley-VCH Verlag GmbH, p. 239-258, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methylol (—CH$_2$OH) group (X=Man).

The heteropolysaccharide used in fluids of the invention may be a diutan gum having a tetrasaccharide repeating unit in the polymer backbone as represented by the chemical formula:

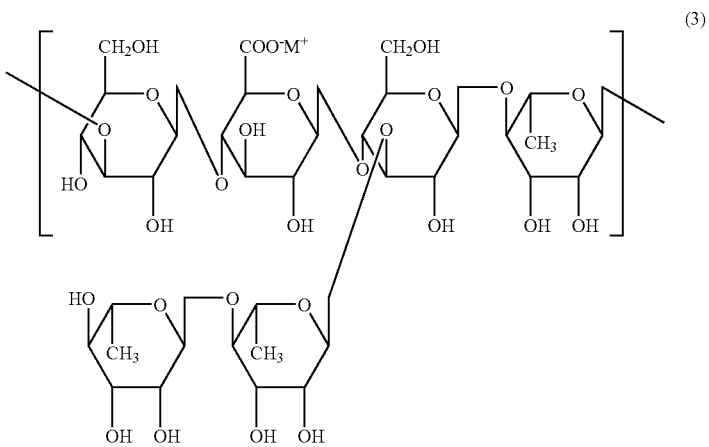

(3)

or represented by the alternative formula scheme:

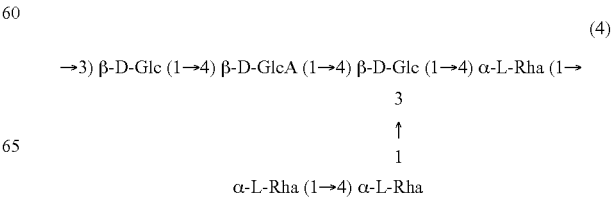

(4)

wherein M⁺ is any ionic species effective to associate via electrostatic interactions with the carboxylic group, wherein M⁺ includes, for example, but not necessarily limited to, $H^+$, $Na^+$, $K^+$, $NH_4^+$, $\frac{1}{2}Ca^{+2}$ and $\frac{1}{2}Mg^{+2}$; and the weight average molecular weight (Mw) for the diutan gum is from about $10^5$ to about $10^7$. Diutan heteropolysaccharides are available, for example, from CP Kelco of 123 North Wacker Dr, Suite 2000 Chicago, Ill. 60606 USA, and may also be used in either crosslinked form, or without crosslinker. Diutan is generally composed of carbohydrate, about 12% protein and about 7% (calculated as O-acetyl) acyl groups, where the carbohydrate portion containing about 19% glucuronic acid, and the neutral sugars rhamnose and glucose are present in the approximate ratio of 2:1. Details of preparing diutan are given in U.S. Pat. No. 5,175,278 (Peik et al.), hereby incorporated by reference. O-acetyl groups may also be present on the number 2 position and the 2,6-positions of the 3-linked D-Glucose unit as described in Diltz, S, and S. G. Zeller, Location of O-acetyl groups in S-657 using the reductive-cleavage method. Carbohydrate Research, 2001. 331: p. 265-270.

Heteropolysaccharides may be incorporated into the fluid embodiments of the invention in amounts ranging from about 0.01% to about 4% by weight of total weight of liquid phase, more particularly from about 0.01% to about 1.5% by weight of the liquid phase, and in certain applications from about 0.10% to about 0.40% by weight of total weight of liquid phase. The term liquid phase means all components of the fluid except any gas component.

In some embodiments, the heteropolysaccharide may be crosslinked with a suitable crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium.

The fluids of the invention may include an electrolyte which may be an organic acid, organic acid salt, or inorganic salt. These will typically be present in a minor amount (e.g. less than about 30% by weight of the liquid phase).

The organic acid may be a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Examples of suitable organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, and 3,4-dichlorobenzoic acid.

The inorganic salts may include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of the fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In certain applications, the electrolyte may be potassium chloride. The electrolyte may be used in an amount of from about 0.01 wt % to about 12 wt % of the total liquid phase weight, and in some instances may be from about 1 wt % to about 8 wt % of the total liquid phase weight.

The treatment fluid may also include an organoamino compound. Examples of suitable organoamino compounds include, but are not necessarily limited to, tetraethylenepentamine, triethylenetetramine, pentaethylhexamine, triethanolamine, and the like, or any mixtures thereof. When organoamino compounds are used in fluids of the invention, they may be incorporated at an amount from about 0.01 wt % to about 2 wt % based on total liquid phase weight. When used, the organoamino compound may be incorporated at an amount from about 0.05 wt % to about 1 wt % based on total liquid phase weight. A particularly useful organoamino compound is tetraethylenepentamine.

When the treatment fluid is foamed or energized, the fluid may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. Nos. 6,703,352 (Dahayanake et al.) and 6,482,866 (Dahayanake et al.), both incorporated herein by reference, are also suitable for use in fluids of the invention. In some embodiments, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, Tex. 77478 USA). In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in the aqueous energized fluids. The fluids may incorporate the surfactant or blend of surfactants in an amount of about 0.02 wt % to about 5 wt % of total liquid phase weight, and more particularly from about 0.05 wt % to about 2 wt % of total liquid phase weight.

Friction reducers may also be incorporated into fluids of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Fluids of the invention also comprise a breaker. The purpose of this component is to "break" or diminish the viscosity of the fluid so that this fluid is more easily recovered from the formation during cleanup. The breaker degrades the polymer to reduce its molecular weight. The present invention makes use of peroxide breakers with oxygen-oxygen single bonds in the molecular structure for breaking the heteropolysaccharide polymer. These peroxide breakers may be hydrogen peroxide or other material that provides peroxide or hydrogen peroxide for reaction in solution. Metal peroxides such as sodium peroxide, calcium peroxide, zinc peroxide, magnesium peroxide and other peroxides such as superoxides, organic peroxides, etc. may also be used. Additionally, the peroxide may be a stabilized peroxide breaker.

As used herein, the expression "stabilized peroxide breaker" refers to those peroxide materials wherein hydrogen peroxide is bound, inhibited, etc. by another compound or molecule(s) prior to its addition to water but that forms or releases hydrogen peroxide in solution when added to water. In some cases, at least about 95%, 96%, 97%, 98%, 99% or 100% of the hydrogen peroxide of the stabilized peroxide breaker is released in solution for reaction. The stabilized peroxide breaker may perform equally or substantially equal with hydrogen peroxide itself, when containing equivalent amounts of peroxide. In its stabilized form prior to its addition to water, however, the stabilized peroxide breaker is less reactive than hydrogen peroxide itself so that the stabilized peroxide breaker can be more easily and safely handled. This is contrasted with straight hydrogen peroxide or its solution that is less stable and requires a high degree of care when handling.

Examples of suitable stabilized peroxide breakers include the adducts of hydrogen peroxide with other molecules, and may include carbamide peroxide or urea peroxide ($CH_4N_2O.H_2O_2$), percarbonates, such as sodium percarbonate ($2Na_2CO_3.3H_2O_2$), potassium percarbonate and ammonium percarbonate. The stabilized peroxide breakers may also include those compounds that undergo hydrolysis in water to release hydrogen peroxide, such sodium perborate. Hydrogen peroxide stabilized with appropriate surfactants may also be used as the stabilized peroxide breaker. An example of a commercially available surfactant-stabilized hydrogen peroxide is BIO-ADD 1105, available from Shrieve Chemical Products, The Woodlands, Tex. Peroxide Rreakers used in some embodiments may be described as diutan reactive, which essentially means the peroxide is effective in breaking the viscosity of a diutan based fluid, whether crosslinked or uncrosslinked. The above mentioned peroxide are some nonlimiting example of a diutan reactive peroxide.

The stabilized peroxide breaker may also include peroxides that are encapsulated. The encapsulation material may be a polymeric enclosure that can slowly release the peroxide in a controllable way. The enclosure may consist of any polymer that can degrade over a period of time to release said chemicals and will typically be chosen depending on the release rate desired. Degradation of the polymer can occur, for example, by hydrolysis, solvolysis, melting, or other mechanisms. The polymers may be selected from homopolymers and copolymers of glycolate and lactate, polycarbonates, polyanhydrides, polyorthoesters, and polyphosphacenes. The encapsulated peroxides may be encapsulated hydrogen peroxide, encapsulated metal peroxides, such as sodium peroxide, calcium peroxide, zinc peroxide, etc. or any of the peroxides described herein that are encapsulated in an appropriate material to inhibit or reduce reaction of the peroxide prior to its addition to water.

The peroxide breaker, stabilized or unstabilized, is used in an amount sufficient to break the heteropolysaccharide polymer or diutan. This may depend upon the amount of heteropolysaccharide used and the conditions of the treatment. Lower temperatures may require greater amounts of the breaker. In many, if not most applications, the peroxide breaker may be used in an amount of from about 0.001% to about 20% by weight of the treatment fluid, more particularly from about 0.005% to about 5% by weight of the treatment fluid, and more particularly from about 0.01% to about 2% by weight of the treatment fluid. The peroxide breaker may be effective in the presence of mineral oil or other hydrocarbon carrier fluids or other commonly used chemicals when such fluids are used with the heteropolysaccharide.

Breaking aids or catalysts may be used with the peroxide breaker. The breaker aid may be an iron-containing breaking aid that acts as a catalyst. The iron catalyst is a ferrous iron (II) compound. Examples of suitable iron (II) compounds include, but are not limited to, iron (II) sulfate and its hydrates (e.g ferrous sulfate heptahydrate), iron (II) chloride, and iron (II) gluconate. Iron powder in combination with a pH adjusting agent that provides an acidic pH may also be used. The acidic pH adjusting agent may be an acid or a latent acid.

Other transition metal ions can also be used as the breaking aid or catalyst, such as manganese (Mn).

The breaking aid (catalyst) may also be in encapsulated form. Those encapsulating materials described previously for encapsulating the peroxide may also be used for encapsulating the breaking aid or catalyst.

The treatment fluid employed in combination with the peroxide breaker has application to low-temperature environments. The peroxide breaker, stabilized or unstabilized and with or without a breaking aid, is effective at lower temperatures of from sub-room temperature (e.g. 0° C. or lower) up to about 150° C. The peroxide breaker is particularly well suited for use at temperatures of from about 20° C. to about 80° C. At lower temperatures, the peroxide breaker is effective at lowering the fluid viscosity. At even lower temperatures, larger amounts of the breaker and/or breaking aid may be used to facilitate breaking of the polymer fluid.

Breakers other than peroxide may be used in combination with the peroxide breaker. These may be acids, oxidizers and enzymes or a combination of these.

In certain embodiments, the treatment fluid may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh (0.841 mm to 0.149 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and may be in the range of from about 0.05 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt and/or organic salt. Inorganic salts may include alkali metal halides, such as potassium chloride. The carrier brine phase may also comprise an organic salt, such as sodium or potassium formate. Inorganic divalent salts may include calcium halides, such as calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in the treatment fluid to achieve a variety of properties including improving particle suspension, and particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, in particular the concentration of fibers may be from about 2 to about 12 grams per liter of liquid, and more particularly from about 2 to about 10 grams per liter of liquid.

Treatment fluids may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, acids or chealants to dissolve solids downhole, alcohols, scale inhibitors, corrosion inhibitors, fluid-loss additives, bactericides, surfactants to reduce capillary pressures or surface tension and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine.

The treatment fluids of the invention employing the peroxide breaker have particular application at lower temperature environments for breaking diutan polymers, as described previously, where conventional breakers are not as effective. The treatment fluids may also be used in higher temperature environments, however.

The fluids of the invention may be used for hydraulically fracturing a subterranean formation. Techniques for hydraulically fracturing a subterranean formation are known to persons of ordinary skill in the art, and involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In the fracturing treatment, fluids of the present invention may be used in the pad treatment, the proppant stage, or both. The components of the liquid phase may be mixed on the surface. Alternatively, the fluid may be prepared on the surface and pumped down tubing while the gas component could be pumped down the annular to mix down hole, or vice versa.

In another application, the treatment fluids are used for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore.

In some cleanup embodiments, the treatment fluids, and methods of using such, are used for cleaning previously uncleanable wellbores up to very high temperatures, such as up to about 325° F., or even higher. In some aspects, the method integrates an optimized jetting nozzle and cleanout fluids, with optional job-planning software and optional real-time monitoring. In accordance with some methods, produced sand and fines, proppant left behind after fracturing, or excess gravel from gravel-packing operations may be efficiently removed, thus leaving the wellbore optimally conditioned for hydrocarbon production and tool runs.

Coiled tubing may be used in some cases to remove produced sand and fines, proppant left behind after fracturing, or excess gravel from gravel-packing operations. When used, the coiled tubing may include a tool with nozzle developed for efficient removal of solids from a wellbore using treatment fluids described herein. Specially angled holes in the body of the nozzle may create a swirling effect that produces a fluid vortex to carry removed particles away to the surface. The jetting energy of the nozzle may agitate and entrain sand into the cleanout fluid, which may help prevent particles from moving deeper past the nozzle, and effectively moves the sand upward in the wellbore.

According to one aspect, a method of cleaning a wellbore includes providing an aqueous treatment fluid based upon a diutan heteropolysaccharide a peroxide breaker for breaking (reducing) the viscosity of the fluid. A coiled tubing apparatus which includes one or more plurality of cleaning nozzles is introduced into the wellbore. The treatment fluid into the wellbore through the coiled tubing to subsequently enable mixing of the treatment fluid and wellbore solids in the wellbore. Subsequently, the viscosity of the mixture of the treatment fluid and the wellbore solids is decreased, either in the wellbore, on the surface, or both.

In another embodiment, the present invention relates to use of fluids based on the invention for gravel packing a wellbore. As a gravel packing fluid, it may comprise gravel or sand and other optional additives, such as filter cake clean up reagents, such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh (2.38 mm to 0.21 mm).

The following examples are presented to illustrate the preparation and properties of aqueous fluids comprising diutan heteropolysaccharides and the peroxide breaker and/or breaking aid (catalyst), and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

Polymer fluids were prepared from fresh water and a diutan gum. Three different loadings of the diutan gum were used at 1.1%, 0.57%, and 0.28% by weight for the fluids. A urea peroxide breaker at 0.72% by weight was added at the same time the fluids were introduced into the viscometer container cup. The urea peroxide of the examples was in powder form, available from Sigma-Aldrich. In all examples presented herein the viscometer was a Fann50-type viscometer with viscosities measured at a shear rate of 40 s$^{-1}$ to reduce shear damage to the fluid. Viscosity for this example was recorded at 200° F. (93.3° C.). The results are presented in FIG. 1. As shown in FIG. 1, the fluid with 0.28% of the polymer broke much faster than the fluids at higher diutan concentrations. All of the fluids showed viscosity breakdown.

Example 2

Figure 2:
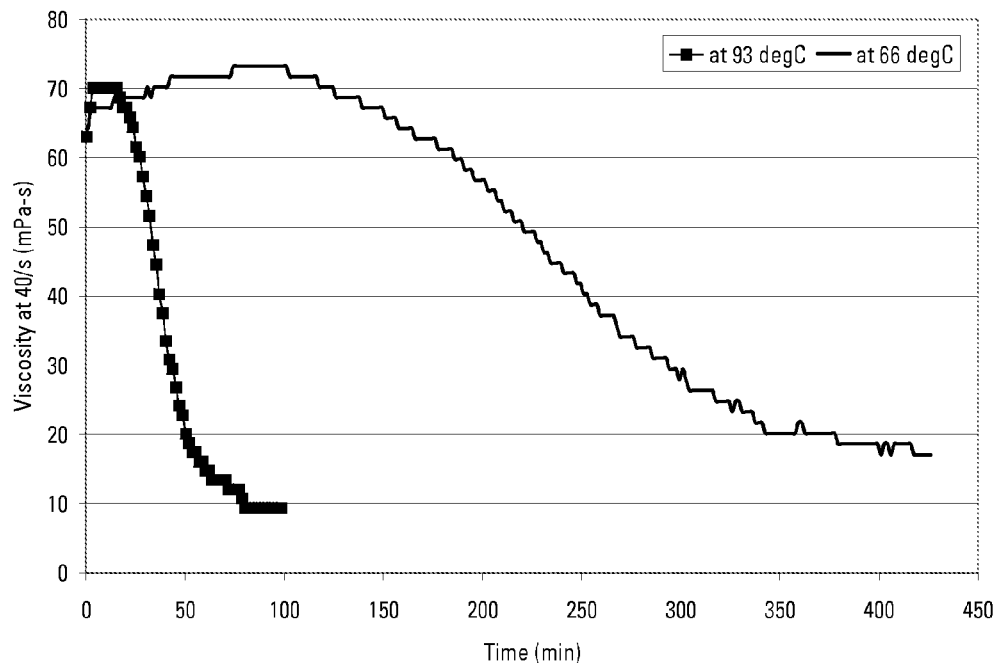
FIG. 2 is a plot of the fluid viscosity at 150° F. (65.6° C.) and 200° F. (93.3° C.) over time of a 0.28% diutan gum solutions containing 0.72% urea peroxide breaker.

A 0.28% diutan fluid containing urea peroxide breaker at 0.72% prepared as in from Example 1 was tested to determine the effect of temperature on the fluid. For the 0.28% diutan fluid, it took much longer to break at the lower temperature of 150° F. (65.6° C.) compared to 200° F. (93.3° C.), as shown in FIG. 2.

Example 3

Figure 3:
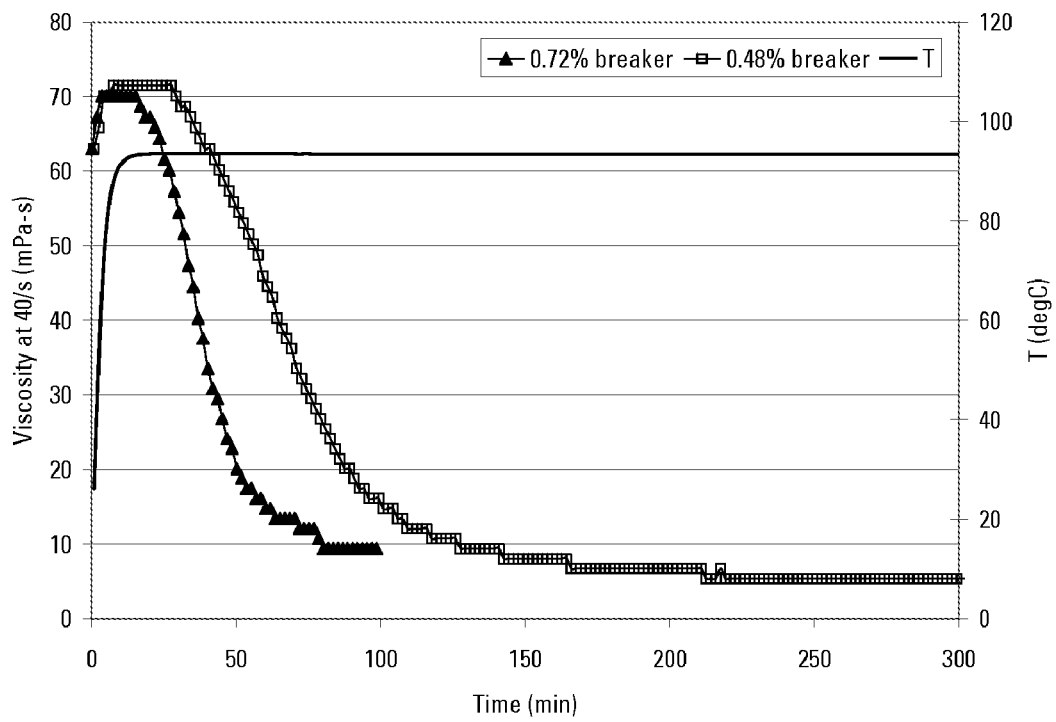
FIG. 3 is a plot of the fluid viscosity at 200° F. (93.3° C.) over time of 0.28% diutan gum solutions containing different amounts of urea peroxide breaker.

A fluid containing 0.28% diutan gum, prepared as in Example 1, was evaluated at temperature of 200° F. (93.3° C.) with different amounts of urea peroxide breaker at 0.48% and 0.72% by weight. The results are presented in FIG. 3. The fluid with a higher dose of urea peroxide breaker resulted in faster breaking of the diutan fluid.

Example 4

Figure 4:
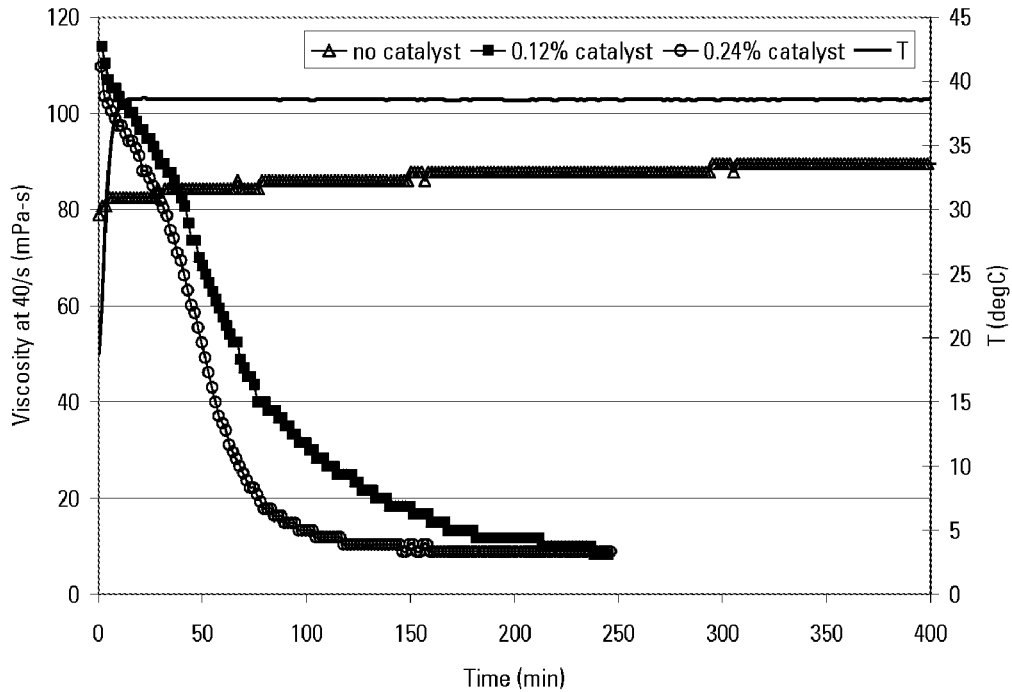
FIG. 4 is a plot of the fluid viscosity at 100° F. (37.8° C.) over time of 0.28% diutan gum solutions containing 0.72% urea peroxide breaker, without and with different amounts of a ferrous sulfate heptahydrate breaking aid (catalyst)

Polymer fluids containing 0.28% diutan gum, prepared as in Example 1, containing 0.72% urea peroxide breaker were tested at temperature of around 100° F. (38° C.), with and without a breaking aid (catalyst). The breaking aid used in the examples was ferrous sulfate heptahydrate ($FeSO_4.7H_2O$), available in powder form from J. T. Baker. The breaking aid was used in amounts of 0.12% and 0.24% by weight. As shown in FIG. 4, the fluid without the breaking aid (catalyst) was barely broken after 400 minutes. When 0.12% of the breaking aid was used, the fluid was readily broken, and with 0.24% of the breaking aid, the fluid broke even faster.

Example 5

A polymer fluid containing 0.28% diutan gum was prepared with 0.48% of the ferrous sulfate heptahydrate breaking aid of Example 4, but without any of the urea peroxide breaker. It was observed that the polymer fluid did not break at 100° F. (38° C.).

Example 6

A polymer fluid was prepared containing 0.28% diutan gum, as in Example 1, 0.72% urea peroxide breaker and triethanolamine at 0.85% by weight. The polymer fluid was tested at temperature of around 100° F. (38° C.) and failed to break.

Example 7

Figure 5:
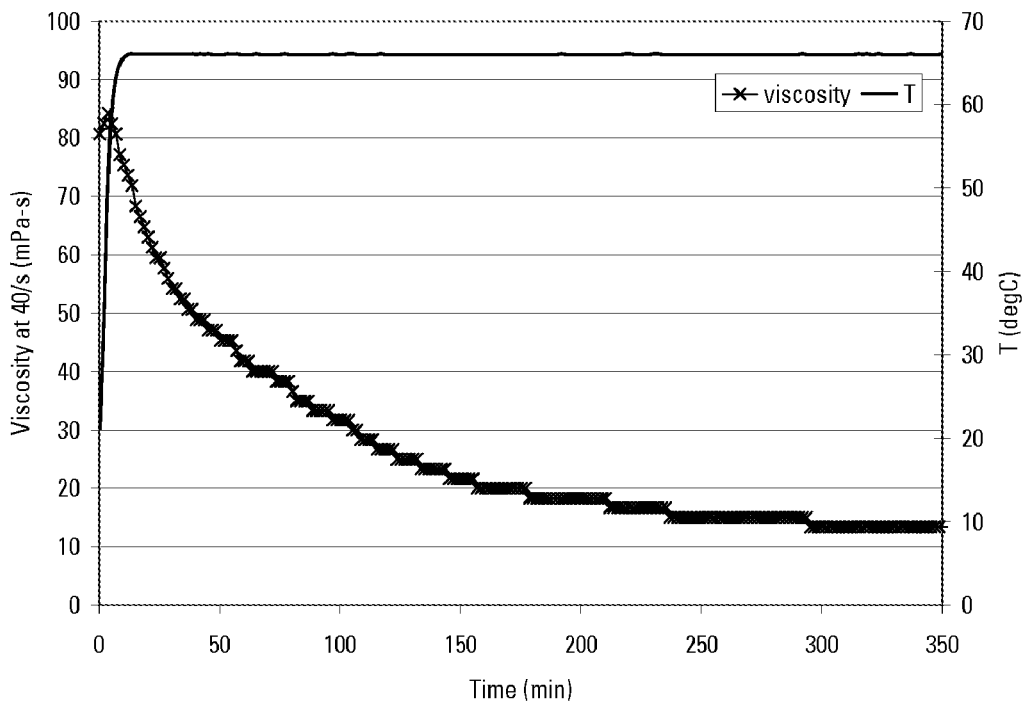
FIG. 5 is a plot of the fluid viscosity at 150° F. (65.6° C.) over time of a 0.28% diutan gum solution containing 0.06% urea peroxide breaker and 0.06% ferrous sulfate heptahydrate breaking aid.

A polymer fluid was prepared containing 0.28% diutan gum, 0.06% urea peroxide breaker and 0.06% of ferrous sulfate heptahydrate as the catalyst or breaking aid. The fluid was tested at a temperature of 150° F. (65.6° C.). As shown in FIG. 5, the fluid was readily broken at this temperature.

Example 8

Figure 6:
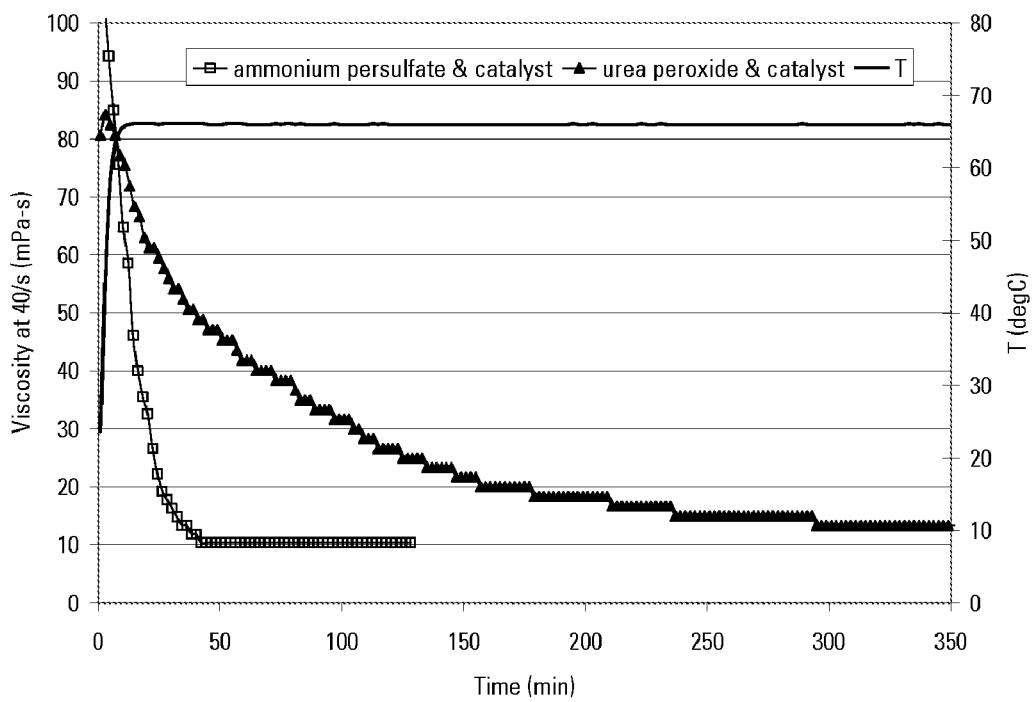
FIG. 6 is a plot of the fluid viscosity at 150° F. (65.6° C.) over time of 0.28% diutan gum solutions containing either 0.14% ammonium persulfate breaker or 0.06% urea peroxide breaker in combination with 0.06% ferrous sulfate heptahydrate breaking aid (catalyst)

Two fluids were prepared with water and 0.28% diutan gum. To one sample was added 0.14% ammonium persulfate, available in powder form, and 0.06% ferrous sulfate heptahydrate breaking aid (catalyst). This was compared to another fluid containing 0.06% urea peroxide breaker and 0.06% ferrous sulfate heptahydrate breaking aid. The concentration of the oxygen-oxygen single bonds of 0.14% ammonium persulfate is about equivalent to that of 0.06% urea peroxide. The fluids were tested at 150° F. (65.6° C.). The results are shown in FIG. 6. As can be seen, the fluid containing ammonium persulfate showed a faster breaking action than that containing urea peroxide. Depending on the how fast the diutan fluid needs to be broken, either ammonium persulfate or urea peroxide can be applied as the breaker.

Example 9

Figure 7:
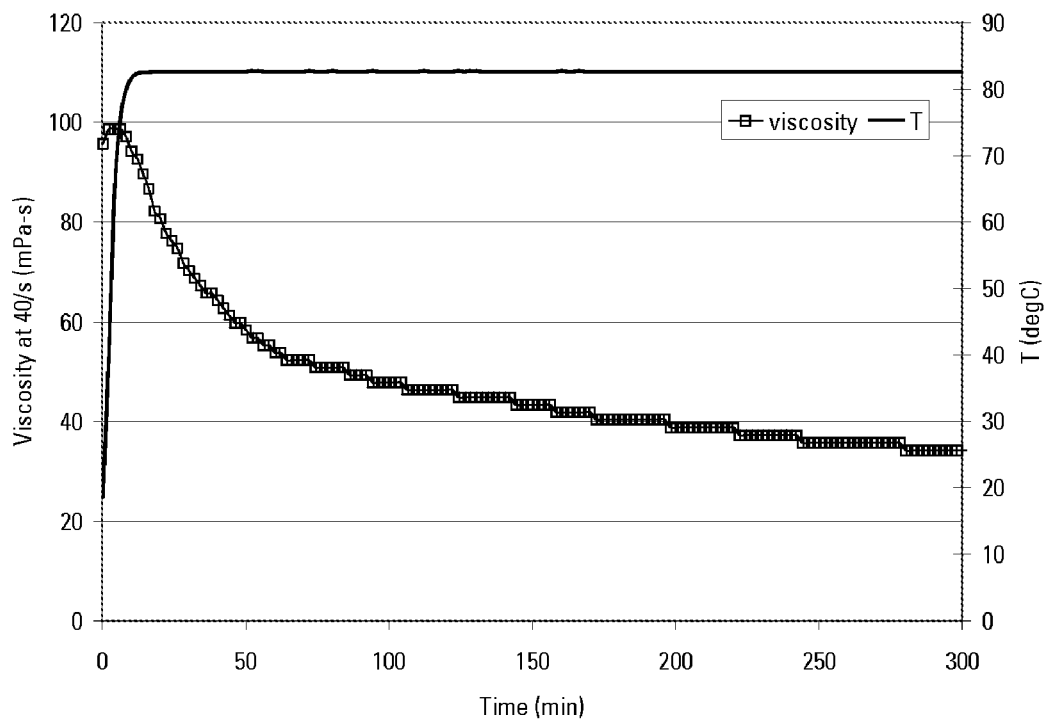
FIG. 7 is a plot of the fluid viscosity at 180° F. (82.2° C.) over time of a 0.28% diutan gum solution and 0.72% sodium percarbonate breaker.
Figure 8:
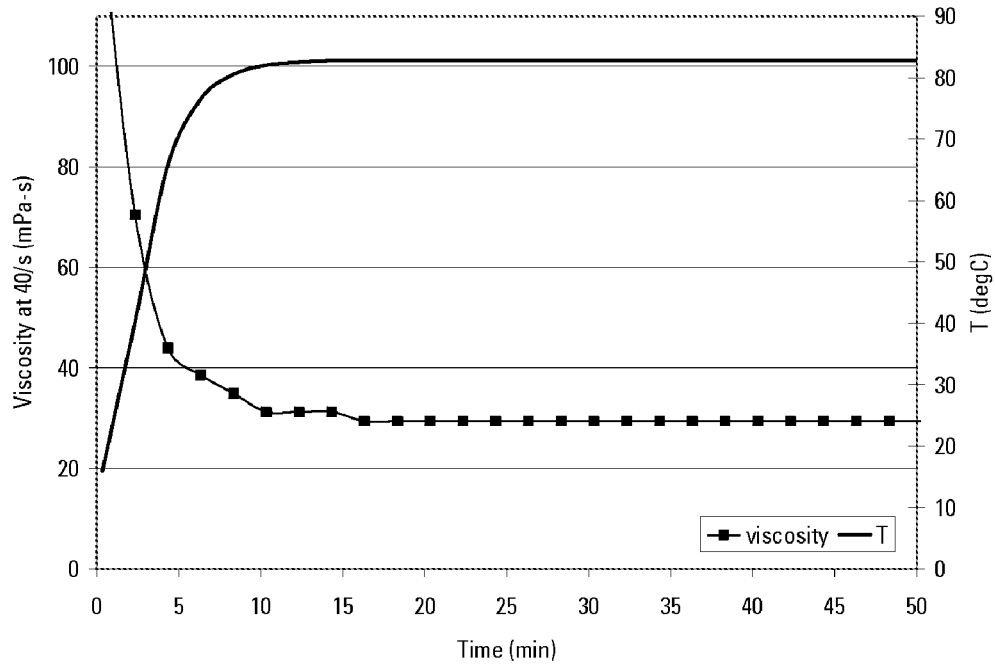
FIG. 8 is a plot of the fluid viscosity at 180° F. (82.2° C.) over time of a 0.28% diutan gum solution employing 0.24% sodium percarbonate breaker and 0.42% ferrous sulfate heptahydrate breaking aid.

Two fluids were prepared with water and 0.28% diutan gum. To one sample was added 0.72% sodium percarbonate without a breaking aid. To the other sample, 0.24% sodium percarbonate and 0.42% ferrous sulfate heptahydrate breaking aid were added. Sodium percarbonate releases hydrogen peroxide and sodium carbonate in water, which increases the pH of the fluid. The fluids were tested at 180° F. (82.2° C.). The fluid with 0.72% sodium percarbonate had a pH of about 10.7 after breaking, with the results being shown in FIG. 7. The fluid with 0.24% sodium percarbonate and 0.42% ferrous sulfate heptahydrate breaking aid broke much faster and had a fluid pH of about 5.5 after breaking, with the results shown in FIG. 8.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

The invention claimed is:

1. A method of treating a subterranean formation penetrated by a wellbore, the method comprising:
   providing a treatment fluid comprising:
      an aqueous medium;
      a diutan heteropolysaccharide having a tetrasaccharide repeating unit in the polymer backbone as represented by the formula:

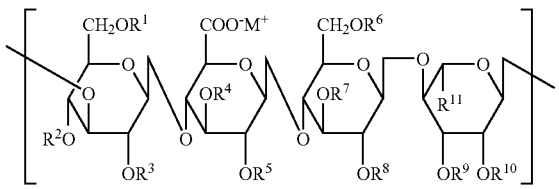

wherein at least three different saccharides are present in the repeating unit, such saccharides including D-glucose, D-glucuronic acid, and either L-rhamnose or L-mannose; $M^+$ is an ionic species; $R^1, R^2, R^3, R^4, R^5, R^6, R^7, R^8, R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$;
   a peroxide breaker selected from the group consisting of urea peroxide, sodium percarbonate, potassium percarbonate, ammonium percarbonate, sodium perborate, hydrogen peroxide, a surfactant-stabilized peroxide, an encapsulated peroxide and combinations thereof; and
   a breaking aid or catalyst selected from the group consisting of iron (II) sulfate and hydrates thereof, iron (II) chloride, iron (II) gluconate, iron powder with a pH-adjusting agent, and combinations thereof; and,
   introducing the treatment fluid into the formation through the wellbore.

2. The method of claim 1, wherein: the treatment fluid further comprises a surfactant and an electrolyte.

3. The method of claim 1, wherein: the treatment fluid further comprises a gas component.

4. The method of claim 1, wherein: the peroxide breaker is present in the treatment fluid in an amount of from about 0.001% to 20% by weight of the treatment fluid.

5. The method of claim 1, wherein: the diutan heteropolysaccharide is present in the treatment fluid in an amount of from about 0.01% to about 4% by weight of the treatment fluid.

6. The method of claim 1 provided a crosslinker is not incorporated to effectively increase viscosity of the treatment fluid.

7. The method of claim 1, wherein: the treatment fluid is introduced into a portion of the formation having a temperature of 200° F. (93.3° C.) or less.

8. A method of cleaning a wellbore comprising:
   providing a treatment fluid comprising:
      an aqueous medium;
      a diutan heteropolysaccharide having a tetrasaccharide repeating unit in the polymer backbone as represented by the formula:

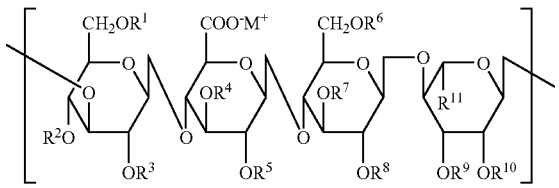

wherein at least three different saccharides are present in the repeating unit, such saccharides including D-glucose, D-glucuronic acid, and either L-rhamnose or L-mannose; $M^+$ is an ionic species; $R^1, R^2, R^3, R^4, R^5, R^6, R^7, R^8, R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$; and
   a diutan reactive peroxide breaker selected from the group consisting of urea peroxide, sodium percarbonate, potassium percarbonate, ammonium percarbonate, sodium perborate, hydrogen peroxide, a surfactant-stabilized peroxide, an encapsulated peroxide and combinations thereof;
   providing a coiled tubing apparatus that further comprises a plurality of cleaning nozzles;
   introducing the coiled tubing apparatus into the wellbore;
   introducing the treatment fluid into the wellbore through the coiled tubing apparatus to enable mixing of the treatment fluid and wellbore solids; and,
   subsequently allowing the diutan reactive peroxide breaker to effectively decrease the viscosity of the mixture of the treatment fluid and the wellbore solids.

* * * * *